US011192829B2

(12) United States Patent
Shim et al.

(10) Patent No.: US 11,192,829 B2
(45) Date of Patent: Dec. 7, 2021

(54) FORMING A SURFACE LAYER OF A CERAMIC MATRIX COMPOSITE ARTICLE

(71) Applicants: Rolls-Royce Corporation, Indianapolis, IN (US); Rolls-Royce High Temperature Composites, Inc., Cypress, CA (US)

(72) Inventors: Sungbo Shim, Irvine, CA (US); Robert Wesley Thibault, Santa Monica, CA (US); Robert Shinavski, Mission Viejo, CA (US); Kang N. Lee, Strongsville, OH (US)

(73) Assignees: Rolls-Royce High Temperature Composites, Inc., Cypress, CA (US); Rolls-Royce Corporation, Indianapolis, IN (US)

( * ) Notice: Subject to any disclaimer, the term of this patent is extended or adjusted under 35 U.S.C. 154(b) by 148 days.

(21) Appl. No.: 16/539,644

(22) Filed: Aug. 13, 2019

(65) Prior Publication Data
US 2019/0389782 A1 Dec. 26, 2019

Related U.S. Application Data

(62) Division of application No. 15/005,790, filed on Jan. 25, 2016, now Pat. No. 10,399,911.
(Continued)

(51) Int. Cl.
*C04B 41/89* (2006.01)
*C04B 41/52* (2006.01)
(Continued)

(52) U.S. Cl.
CPC ............ *C04B 41/89* (2013.01); *C04B 35/573* (2013.01); *C04B 35/62625* (2013.01);
(Continued)

(58) Field of Classification Search
CPC ... C04B 41/89; C04B 41/009; C04B 41/4511; C04B 41/4523; C04B 41/4584;
(Continued)

(56) References Cited

U.S. PATENT DOCUMENTS 5,209,420 A 5/1993 Simmons et al.
5,688,564 A 11/1997 Coddet et al.
(Continued)

OTHER PUBLICATIONS

Notice of Intent to Grant and Text Intended to Grant from counterpart European Application No. 17187608.9, dated Jan. 14, 2019, 86 pp.
(Continued)

*Primary Examiner* — Joseph S Del Sole
*Assistant Examiner* — Jamel M Nelson
(74) *Attorney, Agent, or Firm* — Shumaker & Sieffert, P.A.

(57) ABSTRACT

The disclosure describes techniques for forming a surface layer of an article including a CMC using a cast. In some examples, the surface layer includes three-dimensional surface features, which may increase adhesion between the CMC and a coating on the CMC. In some examples, the surface layer may include excess material, with or without three-dimensional surface features, which is on the CMC. The excess material may be machined to remove some of the excess material and facilitate conforming the article to dimensional tolerances, e.g., for fitting the article to another component. The excess material may reduce a likelihood that the CMC (e.g., reinforcement material in the CMC) is damaged by the machining.

17 Claims, 11 Drawing Sheets

Related U.S. Application Data

(60) Provisional application No. 62/108,369, filed on Jan. 27, 2015.

(51) Int. Cl.

| | | |
|---|---|---|
| *C04B 35/573* | (2006.01) | |
| *C04B 35/626* | (2006.01) | |
| *C04B 35/80* | (2006.01) | |
| *C04B 41/00* | (2006.01) | |
| *C04B 41/45* | (2006.01) | |
| *C04B 41/50* | (2006.01) | |
| *C04B 41/81* | (2006.01) | |
| *C04B 41/85* | (2006.01) | |
| *B33Y 10/00* | (2015.01) | |

(52) U.S. Cl.
CPC ........ *C04B 35/62655* (2013.01); *C04B 35/80* (2013.01); *C04B 41/009* (2013.01); *C04B 41/4511* (2013.01); *C04B 41/4523* (2013.01); *C04B 41/4584* (2013.01); *C04B 41/5024* (2013.01); *C04B 41/5027* (2013.01); *C04B 41/5035* (2013.01); *C04B 41/5045* (2013.01); *C04B 41/52* (2013.01); *C04B 41/81* (2013.01); *C04B 41/85* (2013.01); *B33Y 10/00* (2014.12); *C04B 2235/612* (2013.01); *C04B 2235/616* (2013.01); *C04B 2235/77* (2013.01); *C04B 2235/945* (2013.01); *C04B 2235/95* (2013.01); *C04B 2237/062* (2013.01); *C04B 2237/08* (2013.01); *C04B 2237/083* (2013.01); *C04B 2237/127* (2013.01); *C04B 2237/128* (2013.01); *C04B 2237/16* (2013.01); *C04B 2237/34* (2013.01); *C04B 2237/341* (2013.01); *C04B 2237/343* (2013.01); *C04B 2237/346* (2013.01); *C04B 2237/348* (2013.01); *C04B 2237/38* (2013.01); *C04B 2237/61* (2013.01)

(58) Field of Classification Search
CPC ............ C04B 41/5024; C04B 41/5027; C04B 41/5035; C04B 41/5045; C04B 41/81; C04B 41/85; C04B 41/52; C04B 35/573; C04B 35/62625; C04B 35/62655; C04B 35/80; C04B 35/806; C04B 2235/612; C04B 2235/616; C04B 2235/77; C04B 2235/945; C04B 2235/95; C04B 2237/062; C04B 2237/08; C04B 2237/083; C04B 2237/127; C04B 2237/128; C04B 2237/16; C04B 2237/34; C04B 2237/341; C04B 2237/343; C04B 2237/346; C04B 2237/348; C04B 2237/38; B33Y 10/00

See application file for complete search history.

(56) References Cited

U.S. PATENT DOCUMENTS

| | | | |
|---|---|---|---|
| 6,459,069 B1 * | 10/2002 | Rabinovich | B23P 15/04 219/121.63 |
| 8,257,833 B2 | 9/2012 | Hasz | |
| 8,475,946 B1 | 7/2013 | Dion et al. | |
| 8,591,622 B2 | 11/2013 | Gallagher et al. | |
| 2003/0094730 A1 * | 5/2003 | Dourfaye | E21B 10/55 264/219 |
| 2009/0186237 A1 | 7/2009 | Lee | |
| 2010/0279007 A1 * | 11/2010 | Briselden | C22C 32/00 427/243 |
| 2012/0126458 A1 * | 5/2012 | King | B82Y 40/00 264/483 |
| 2012/0308837 A1 | 12/2012 | Schlechtriemen et al. | |
| 2013/0209745 A1 | 8/2013 | Legoux et al. | |
| 2013/0247475 A1 | 9/2013 | Lind et al. | |
| 2013/0333950 A1 | 12/2013 | Atkins et al. | |
| 2014/0162027 A1 | 6/2014 | Meschter et al. | |
| 2016/0214907 A1 | 7/2016 | Shim et al. | |

OTHER PUBLICATIONS

Examination Report from counterpart European Application No. 17187608.9, dated Sep. 11, 2018, 3 pp.

Response to Examination Report dated Sep. 11, 2018, from counterpart European Application No. 17187608.9, filed Nov. 28, 2018, 17 pp.

Ozcan et al., "Effects of silicon coating on bond strength of two different titanium ceramic to titanium," Academy of Dental Material, Elsevier Ltd, vol. 21, issue 8, pp. 773-779, accessed at sciencedirect.com on Jul. 12, 2018.

Response to Extended Search Report dated Nov. 30, 2017, from counterpart European Application No. 17187608.9, filed Jul. 17, 2018, 5 pp.

Extended Search Report from counterpart European Application No. 17187608.9, dated Nov. 30, 2017, 7 pp.

Intent to Grant dated May 9, 2017, from counterpart European Application No. 16152725.4, 7 pp.

Response to European Search Opinion dated Jun. 27, 2016, from counterpart European Application No. 16152725.4, filed Jan. 24, 2017, 5 pp.

Extended Search Report from counterpart European Application No. 16152725.4, dated Jun. 27, 2016, 9 pp.

Prosecution History from U.S. Appl. No. 15/005,790, dated Mar. 1, 2018 through May 3, 2019, 62 pp.

* cited by examiner

FORMING A SURFACE LAYER OF A CERAMIC MATRIX COMPOSITE ARTICLE

This application is a divisional application of U.S. application Ser. No. 15/005,790 filed Jan. 25, 2016, which claims the benefit of U.S. Provisional Application No. 62/108,369 filed Jan. 27, 2015, which is incorporated herein by reference in its entirety.

TECHNICAL FIELD

The present disclosure generally relates to techniques for forming a surface layer of a ceramic matrix composite article.

BACKGROUND

Ceramic matrix composite (CMC) materials may be useful in a variety of contexts where mechanical and thermal properties are important. For example, components of high temperature mechanical systems, such as gas turbine engines, may be made from CMCs. CMCs may be resistant to high temperatures, but some CMCs may react with some elements and compounds present in the operating environment of high temperature mechanical systems, such as water vapor. These reactions may damage the CMC and reduce mechanical properties of the CMC, which may reduce the useful lifetime of the component. Thus, in some examples, a CMC component may be coated with environmental barrier coatings, which may reduce exposure of the CMC component to elements and compounds present in the operating environment of high temperature mechanical systems.

SUMMARY

In some examples, the disclosure describes a method that includes depositing a slurry on a surface of an impregnated porous preform using a cast to form a surface layer including a plurality of three-dimensional surface features. In some examples, the cast may define the negative of the three-dimensional surface features, and the impregnated porous preform may include a reinforcement material and at least one matrix precursor. The method also may include drying the slurry to form a greenbody preform and infiltrating the greenbody preform with a molten infiltrant to form a composite article including the three-dimensional surface features.

In some examples, the disclosure describes a method that includes impregnating a porous preform with a slurry to form an impregnated porous preform including a surface layer including a plurality of three-dimensional surface features. In some examples, the shapes of respective three-dimensional surface features the plurality of three-dimensional surface features are defined by a cast. The method also may include drying the slurry to form a greenbody preform and infiltrating the greenbody preform with a molten infiltrant to form a composite article including the three-dimensional surface features.

In some examples, the disclosure describes a method that includes depositing a slurry on a surface of an impregnated porous preform using a cast to form a surface layer including excess material. In some examples, the cast may define the shape of the surface layer including excess material, and the impregnated porous preform may include a reinforcement material and at least one matrix precursor. The method also may include drying the slurry to form a greenbody preform, infiltrating the greenbody preform with a molten infiltrant to form a composite article including the surface layer including excess material, and machining the composite article to remove at least some of the surface layer including excess material to define a contact surface for contacting another component.

In some examples, the disclosure describes a method that includes impregnating a porous preform with a slurry to form an impregnated porous preform including a surface layer including excess material. In some examples, the shape of the surface layer including the excess material may be defined by a cast. The method also may include drying the slurry to form a greenbody preform, infiltrating the greenbody preform with a molten infiltrant to form a composite article including the surface layer including excess material, and machining the composite article to remove at least some of the surface layer including excess material to define a contact surface for contacting another component.

In some examples, the disclosure describes an assembly including a flexible cast and a porous preform. The flexible cast may be adjacent to a surface of the porous preform. The assembly also may include a slurry in space between the flexible cast and the surface of the porous preform, and in pores of the porous preform.

In some examples, the disclosure describes an assembly that includes a flexible cast and an impregnated porous preform. The impregnated porous preform may include a reinforcement material and at least one matrix precursor, and the flexible cast may be adjacent to a surface of the impregnated porous preform. The assembly also may include a slurry in space between the flexible cast and the surface of the impregnated porous preform.

In some examples, the disclosure describes a composite article formed by any of the techniques described herein.

In some examples, the disclosure describes an apparatus for performing any of the techniques described herein.

The details of one or more examples are set forth in the accompanying drawings and the description below. Other features, objects, and advantages will be apparent from the description and drawings, and from the claims.

DETAILED DESCRIPTION

Figure 1:
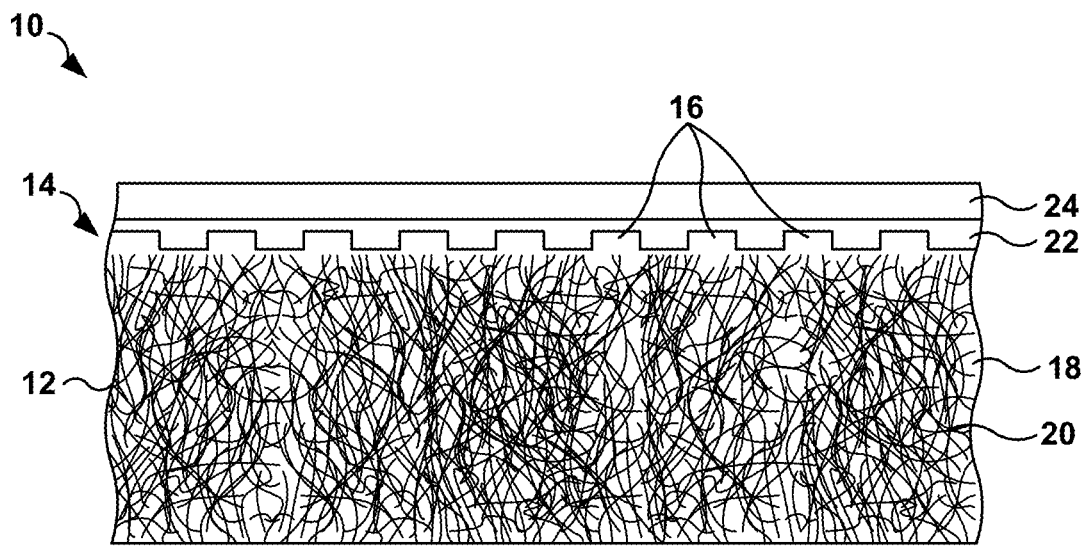
FIG. 1 is a conceptual diagram illustrating an example article including a ceramic matric composite (CMC) that includes a surface layer including three-dimensional surface features.

The disclosure describes techniques for forming a surface layer of an article including a CMC using a cast. In some examples, the surface layer includes three-dimensional surface features, which may increase adhesion between the CMC and a coating on the CMC. In some examples, the surface layer may include excess material, with or without three-dimensional surface features, which is on the CMC. The excess material may be machined to remove some of the excess material and facilitate conforming the article to dimensional tolerances, e.g., for fitting the article to another component. The excess material may reduce a likelihood that the CMC (e.g., reinforcement material in the CMC) is damaged by the machining.

In some examples, the cast may be used when forming the surface layer via a slurry infiltration technique. For example, a porous preform including reinforcement material may be placed in a mold in which the cast is also disposed. The porous preform may be infiltrated with a slurry that includes matrix material precursor. The slurry may substantially fill the geometry defined by the cast. The slurry may be dried to form a greenbody preform, which then may be melt infiltrated to form the CMC article including the surface layer.

In other examples, the cast may be used to form the surface layer via a stamping technique. For example, the greenbody preform including the reinforcement material and dried slurry that includes matrix material precursor may be formed as described above, but in a mold that does not include the cast. The cast then may be at least partially filled with a slurry. This slurry may be the same or different than the slurry used to infiltrate the porous preform. The cast then may be used to stamp the slurry onto at least part of at least one surface of the greenbody preform. The stamped slurry may be dried, and the article melt infiltrated to form the CMC article including the surface layer.

In some examples, the cast may be used to form three-dimensional surface features on a CMC without machining the surface of the CMC. CMC may be difficult to machine, e.g., due to high hardness of the CMC, which may cause machining to take a long time; propensity of the matrix phase of the CMC to crack during machining; damage to the reinforcement fibers of the CMC, which may reduce mechanical properties of the CMC; or exposing the reinforcement phase, which may increase the oxidation rate of the surface of the CMC. Thus, use of the cast may reduce damage to the CMC, reduce time to form the CMC, or both.

Three-dimensional surface features may be used to improve adhesion of a coating to the CMC surface. For example, environmental barrier coatings (EBCs) may be applied to a CMC to reduce damage to the CMC from exposure to reactive species present in the operating environment of the CMC, such as water vapor. An EBC may include, for example, a silicon-based bond coat and a ceramic top coat. The three-dimensional surface features may increase adhesion between the silicon-based bond coat and the CMC.

In some examples, when the cast is used in a stamping technique, the slurry applied to the surface of the greenbody porous preform ("the second slurry") is different than the slurry infiltrated into the porous preform ("the first slurry"). In some of these examples, the second slurry may include precursors of the bond coat. For example, the slurry may include a precursor to a secondary component in the silicon-based bond coating. By depositing the second slurry prior to melt infiltration, the melt infiltration process may result in a stronger bond between the CMC and the bond coating, e.g., compared to some bond coatings deposited after formation of the CMC.

FIG. 1 is a conceptual diagram illustrating an example article 10 including a CMC 12 that includes a surface layer 14 including three-dimensional surface features 16. In the example illustrated in FIG. 1, article 10 also includes a bond coating 22 on the surface layer 14 and an outer coating 24 on the bond coating 22.

Article 10 may be a component of a high temperature mechanical system. For example, article 10 may be a seal segment, a blade track, an airfoil, a blade, a vane, a combustion chamber liner, or the like, of a gas turbine engine.

Article 10 includes CMC 12. CMC 12 includes a matrix material 18 and a reinforcement material 20. Matrix material 18 includes a ceramic material, such as, for example, silicon carbide (SiC), silicon nitride ($Si_3N_4$), alumina ($Al_2O_3$), aluminosilicate, silica ($SiO_2$), or the like. In some examples, matrix material 18 additionally may include silicon metal, carbon, or the like. In some examples, matrix material 18 may include mixtures of two or more of SiC, $Si_3N_4$, $Al_2O_3$, aluminosilicate, silica, silicon metal, carbon, or the like.

CMC 12 further includes reinforcement material 20. Reinforcement 20 may be a continuous or discontinuous. For example, reinforcement material 20 may include discontinuous whiskers, platelets, or particulates. As other examples, reinforcement material 20 may include a continuous monofilament or multifilament weave. In some examples, reinforcement material 20 may include SiC, $Si_3N_4$, $Al_2O_3$, aluminosilicate, $SiO_2$, or the like. In some examples, article includes a SiC—SiC ceramic matrix composite, which includes matrix material 18 including SiC and reinforcement material 20 including SiC.

Article 10 also includes surface layer 14. Surface layer 14 includes three-dimensional surface features 16. In the example shown in FIG. 1, surface layer 14 includes a similar or substantially the same composition as matrix material 18. For example, surface layer 14 may include at least one of SiC, $Si_3N_4$, $Al_2O_3$, aluminosilicate, silica, silicon, metal carbon, or the like. As described below with respect to FIGS. 5 and 6, surface layer 14 may be formed using impregnation and infiltration such that surface layer 14 is integral with CMC 12.

Three-dimensional surface features 16 disrupt the relative planarity of the surface of CMC 12, e.g., each of surface features 16 may form a discontinuity in the surface of CMC 12. Three-dimensional surface features 16 may impede crack growth in bond coating 22 in a plane parallel to the surface of CMC 12. While not wishing to be bound by any particular theory, three-dimensional surface features 16 may result in an interface between CMC 12 and bond coating 22 across which a crack would need to propagate to grow from a portion of bond coating 22 to a portion of CMC 12. The transition between dissimilar materials, e.g., bond coating 22 and CMC 12, may impede crack growth across the interface of the two materials, and may contain crack growth to a single domain, e.g., a portion of bond coating 22 located in lower portion of three-dimensional surface features 16. Accordingly, even if a crack grows to the extent that a portion of bond coating 22 (and outer coating 24) delaminates from CMC 12, the portion of bond coating 22 (and outer coating 24) that delaminates may be limited to a smaller portion compared to CMC that does not include three-dimensional surface features 16.

Figure 2:
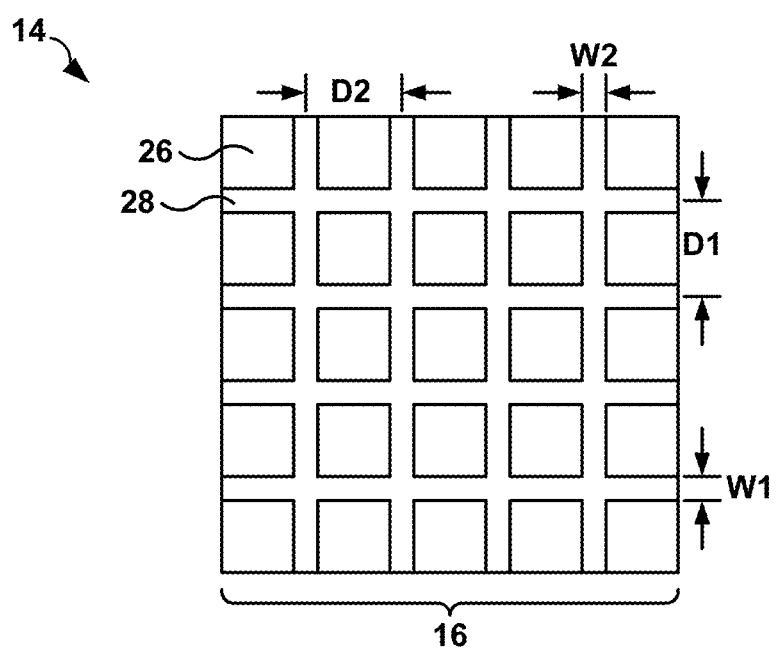
FIG. 2 is a top view of the example surface layer of FIG. 1 illustrating three-dimensional surface features.

Three-dimensional surface features 16 may include, for example, depressions, protrusions, grooves, or ridges. For example, FIG. 2 is a top view of the example surface layer 14 of FIG. 1 illustrating three-dimensional surface features 16. As shown in FIG. 2, three-dimensional surface features 16 include a grid 28 that defines discrete plateaus 26. In some examples, grid 28 may include grooves and the plateaus 26 may include protrusions. In other examples, grid 28 may include ridges and the plateaus 26 may include depressions. In other words, grid 28 may be raised relative to plateaus 26 or plateaus 26 may be raised relative to grid 28.

Figure 3A:
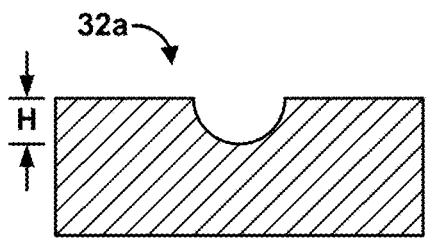
FIGS. 3A-3J are conceptual diagrams illustrating example three-dimensional surface features.
Figure 3B:
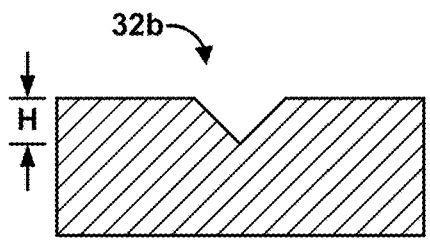
Figure 3C:
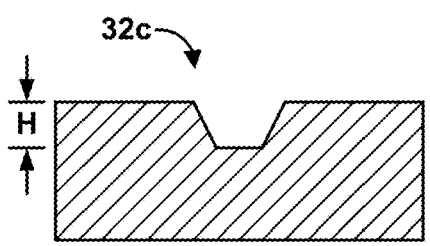
Figure 3D:
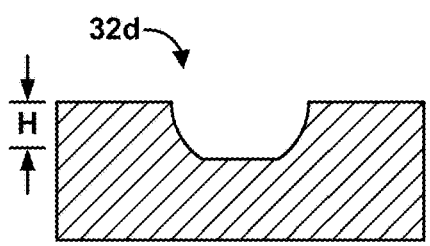
Figure 3E:
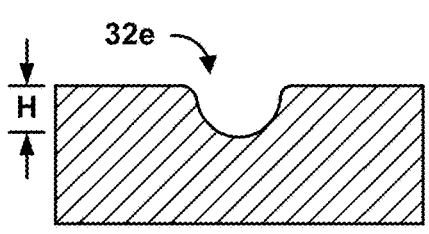
Figure 3F:
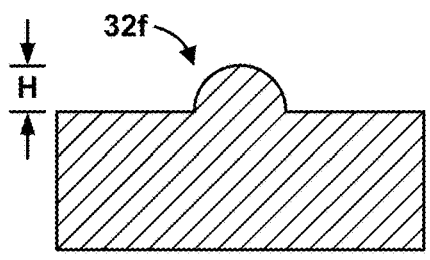
Figure 3G:
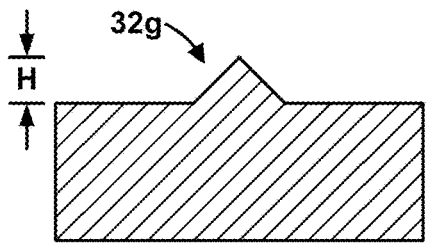
Figure 3H:
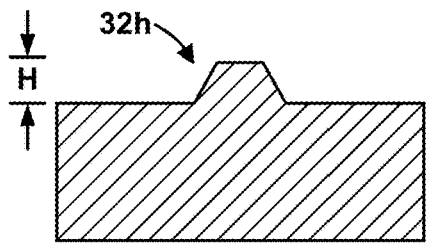
Figure 3I:
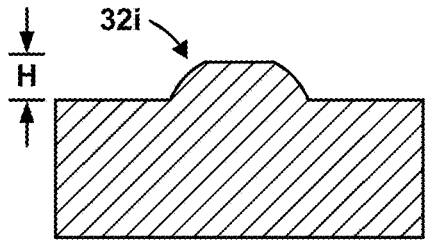
Figure 3J:
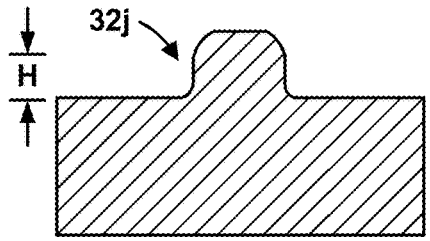

Three-dimensional surface features 16 may include a cross-sectional shape, and each surface feature of three-dimensional surface features 16 may include the same cross-sectional shape, or at least one three-dimensional surface feature may include a different cross-sectional shape. For example, as shown in FIG. 1, three-dimensional surface features 16 may include a rectangular cross-section (either protruding or recessed). FIGS. 3A-3J are conceptual diagrams illustrating other example cross-sectional shapes for three-dimensional surface features. For example, as shown in FIG. 3A, a three-dimensional surface feature 32a may include a generally arcuate cross-section, such as a half-circle or another, lesser, portion of a circle. In other examples, as shown in FIGS. 3B-3E, a three-dimensional surface feature 32b may include a generally triangular cross-section, a three-dimensional surface feature 32c may include a generally trapezoidal cross-section, a three-dimensional surface feature 32d may include a truncated arcuate cross-section, or a three-dimensional surface feature 32e may include a rounded arcuate cross-section. Each of the three-dimensional surface features 32a-32e are depressions or grooves. In other examples, as shown in FIGS. 3F-3J, three-dimensional surface features 32f-32j may be protrusions or ridges, and may include a generally arcuate cross-section, a generally triangular cross-section, a rounded arcuate cross-section, respectively. Such cross-sectional profiles are merely examples; other cross-sectional profiles are also possible and will be apparent to those of ordinary skill in the art.

The depth or height, H, of at least one of three-dimensional surface features 16 may be less than about 1.27 millimeters (less than about 50 mils). In some examples, the depth or height, H, of at least one of three-dimensional surface features 16 may be less than about 0.508 millimeters (less than about 20 mils), or may be less than about 0.254 millimeters (less than about 10 mils). In some examples, the depth or height, H, of at least one of three-dimensional surface features 16 may be between approximately 0.1016 millimeters (about 4 mils) and about 0.508 millimeters (about 20 mils), or between about 0.1016 millimeters (about 4 mils) and about 0.2032 millimeters (about 8 mils). The depth or height, H, of each of three-dimensional surface features 16 may substantially similar, may increase or decrease monotonically, may increase and then decrease, or may decrease and then increase.

Returning to FIG. 2, in some examples, each of three-dimensional surface features 16 may be approximately the same width W. In other examples, one or more three-dimensional surface features 16 may be a different width W than other three-dimensional surface features 16. In some examples, a width W of at least one of three-dimensional surface features 16 may be less than about 6.35 millimeters (about 0.25 inch), or may be less than about 2.54 millimeters (about 0.1 inch). In some examples, a width W of at least one of three-dimensional surface features 16 may be between about 0.127 millimeters (about 0.005 inch) and about 3.175 millimeters (about 0.125 inch), or between about 0.254 mm (about 0.010 inch) and about 1.27 millimeters (about 0.05 inch).

Adjacent features of three-dimensional surface features 16 may be spaced approximately evenly apart, or may be spaced different distances apart. The distance D between adjacent surface features of three-dimensional surface features 16 may be referred to as pitch, and in some examples, may be less than about 6.35 millimeters (about 0.25 inch). In some examples, the pitch may increase or decrease monotonically. In other examples, the pitch may increase and then decrease or may decrease and then increase. In yet other examples, as illustrated in FIG. 2, the pitch may be approximately constant.

In some examples, three-dimensional surface features 16 may be on substantially all of at least one surface of CMC 12. For example, one surface of CMC 12 may be a surface exposed to environmental conditions that could damage CMC 12. That surface of CMC 12 may be covered with an environmental barrier coating (EBC), and may include three-dimensional surface features 16 to improve adhesion between the EBC and CMC 12. In other examples, three-dimensional surface features 16 may be on a part of at least one surface of CMC 12. For example, only a portion of a surface of CMC 12 may be a surface exposed to environmental conditions that could damage CMC 12. The portion of the surface of CMC 12 may be covered with an environmental barrier coating (EBC), and may include three-dimensional surface features 16 to improve adhesion between the EBC and CMC 12.

In some examples, three-dimensional surface features 16 may be formed in a first array in a first location on CMC 12 and in a second array in a second location on the CMC 12. The pattern of the first array and the pattern of the second array, and the first and second locations, may be selected based on a prediction of the thermal stress that CMC 12 will experience at the first location and the second location, respectively. For example, CMC 12 may experience higher temperatures or more severe temperature changes at the first location and lower temperatures or less severe temperature changes at the second location. Based on this, the pattern of the first array of three-dimensional surface features 16 may be selected to be different than the pattern of the second array of three-dimensional surface features 16. For example, the first array of three-dimensional surface features 16 may include features that are spaced more closely together, have a different shape, or include another characteristic that provides superior thermal stress mitigation than the second array of three-dimensional surface features 16.

Article 10 also includes a bond coating 22 on surface layer 14. In other examples, article 10 may omit bond coating 22. Bond coating 22 may include any useful material that improves adhesion between CMC 12 and outer coating 24. In some examples, bond coating 22 may include silicon metal, alone, or mixed with at least one other constituent. For example, bond coating 22 may include silicon metal and at least one of a transition metal carbide, a transition metal boride, or a transition metal nitride. The transition metal may include, for example, Cr, Mo, Nb, W, Ti, Ta, Hf, or Zr. The at least one transition metal carbide may include at least one of $Cr_3C_2$, $Cr_7C_3$, $Cr_{23}C_6$, $Mo_2C$, NbC, WC, TaC, HfC, or ZrC. The at least one transition metal boride may include at least one of TaB, $TaB_2$, $TiB_2$, $ZrB_2$, HfB, or $HfB_2$. The at least one transition metal nitride may include at least one of TiN, ZrN, HfN, $Mo_2N$, or TaN. As other examples, bond coating 22 may include mullite (aluminum silicate, $Al_6Si_2O_{13}$), silica, a silicide, or the like, alone, or in any combination (including in combination with one or more of silicon metal, a transition metal carbide, a transition metal boride, or a transition metal nitride).

Bond coating 22 may be formed on surface layer 14 using, for example, plasma spraying, physical vapor deposition (PVD), electron beam physical vapor deposition (EB-PVD), directed vapor deposition (DVD), chemical vapor deposition (CVD), cathodic arc deposition slurry process deposition, sol-gel process deposition, electrophoretic deposition, or the like.

Outer coating 24 is on bond coating 22 may include one or more layer. For example, outer coating 24 may include at least one of an environmental barrier coating (EBC) layer, an abradable coating layer, a calcia-magnesia-aluminosilicate (CMAS)-resistant EBC layer, or the like. In some examples, a single layer in outer coating 24 may perform two or more of these functions. For example, an EBC may provide environmental protection, thermal protection, and CMAS-resistance to CMC 12. In some examples, instead of including a single layer in outer coating 24, article 10 may include a plurality of overlying layers, such as at least one EBC layer, at least one CMAS-resistant layer, or combinations thereof.

An EBC layer may include at least one of a rare earth oxide, a rare earth silicate, an aluminosilicate, or an alkaline earth aluminosilicate. For example, an EBC layer may include mullite, barium strontium aluminosilicate (BSAS), barium aluminosilicate (BAS), strontium aluminosilicate (SAS), at least one rare earth oxide, at least one rare earth monosilicate ($RE_2SiO_5$, where RE is a rare earth element), at least one rare earth disilicate ($RE_2Si_2O_7$, where RE is a rare earth element), or combinations thereof. The rare earth element in the at least one rare earth oxide, the at least one rare earth monosilicate, or the at least one rare earth disilicate may include at least one of Lu (lutetium), Yb (ytterbium), Tm (thulium), Er (erbium), Ho (holmium), Dy (dysprosium), Tb (terbium), Gd (gadolinium), Eu (europium), Sm (samarium), Pm (promethium), Nd (neodymium), Pr (praseodymium), Ce (cerium), La (lanthanum), Y (yttrium), or Sc (scandium). In some examples, the at least one rare earth oxide includes an oxide of at least one of Yb, Y, Gd, or Er.

In some examples, an EBC layer may include at least one rare earth oxide and alumina, at least one rare earth oxide and silica, or at least one rare earth oxide, silica, and alumina. In some examples, an EBC layer may include an additive in addition to the primary constituents of the EBC layer. For example, an EBC layer may include at least one of $TiO_2$, $Ta_2O_5$, $HfSiO_4$, an alkali metal oxide, or an alkali earth metal oxide. The additive may be added to the EBC layer to modify one or more desired properties of the EBC layer. For example, the additive components may increase or decrease the reaction rate of the EBC layer with CMAS, may modify the viscosity of the reaction product from the reaction of CMAS and the EBC layer, may increase adhesion of the EBC layer to bond coating 22, may increase or decrease the chemical stability of the EBC layer, or the like.

In some examples, the EBC layer may be substantially free (e.g., free or nearly free) of hafnia and/or zirconia. Zirconia and hafnia may be susceptible to chemical attack by CMAS, so an EBC layer substantially free of hafnia and/or zirconia may be more resistant to CMAS attack than an EBC layer that includes zirconia and/or hafnia.

In some examples, the EBC layer may have a dense microstructure, a columnar microstructure, or a combination of dense and columnar microstructures. A dense microstructure may be more effective in preventing the infiltration of CMAS and other environmental contaminants, while a columnar microstructure may be more strain tolerant during thermal cycling. A combination of dense and columnar microstructures may be more effective in preventing the infiltration of CMAS or other environmental contaminants than a fully columnar microstructure while being more strain tolerant during thermal cycling than a fully dense microstructure. In some examples, an EBC layer with a dense microstructure may have a porosity of less than about 20 vol. %, such as less than about 15 vol. %, less than 10 vol. %, or less than about 5 vol. %, where porosity is measured as a percentage of pore volume divided by total volume of the EBC layer.

In some examples, outer coating 24 may include an abradable layer. An abradable layer may include at least one of a rare earth oxide, a rare earth silicate, an aluminosilicate, or an alkaline earth aluminosilicate. For example, an EBC layer may include mullite, barium strontium aluminosilicate (BSAS), barium aluminosilicate (BAS), strontium aluminosilicate (SAS), at least one rare earth oxide, at least one rare earth monosilicate ($RE_2SiO_5$, where RE is a rare earth element), at least one rare earth disilicate ($RE_2Si_2O_7$, where RE is a rare earth element), or combinations thereof. The rare earth element in the at least one rare earth oxide, the at least one rare earth monosilicate, or the at least one rare earth disilicate may include at least one of Lu (lutetium), Yb (ytterbium), Tm (thulium), Er (erbium), Ho (holmium), Dy (dysprosium), Tb (terbium), Gd (gadolinium), Eu (europium), Sm (samarium), Pm (promethium), Nd (neodymium), Pr (praseodymium), Ce (cerium), La (lanthanum), Y (yttrium), or Sc (scandium). In some examples, the at least one rare earth oxide includes an oxide of at least one of Yb, Y, Gd, or Er.

The abradable layer may be porous. Porosity of the abradable layer may reduce a thermal conductivity of the abradable layer and/or may affect the abradability of the abradable layer. In some examples, the abradable layer includes porosity between about 10 vol. % and about 50 vol. %. In other examples, the abradable layer includes porosity between about 15 vol. % and about 35 vol. %, or about 20 vol. %. Porosity of the abradable layer is defined herein as a volume of pores or cracks in the abradable layer divided by a total volume of the abradable layer (including both the volume of material in the abradable layer and the volume of pores/cracks in the abradable layer).

The abradable layer may be formed using, for example, a thermal spraying technique, such as, for example, plasma spraying. Porosity of the abradable layer may be controlled by the use of coating material additives and/or processing techniques to create the desired porosity. In some examples, substantially closed pores may be desired.

For example, a coating material additive that melts or burns at the use temperatures of the component (e.g., a blade track) may be incorporated into the coating material that forms the abradable layer. The coating material additive may include, for example, graphite, hexagonal boron nitride, or a polymer such as a polyester, and may be incorporated into the coating material prior to deposition of the coating material over CMC 12 to form the abradable layer. The coating material additive then may be melted or burned off in a post-formion heat treatment, or during operation of the gas turbine engine, to form pores in the abradable layer. The post-deposition heat-treatment may be performed at up to about 1500° C.

The porosity of the abradable layer can also be created and/or controlled by plasma spraying the coating material using a co-spray process technique in which the coating material and coating material additive are fed into the plasma stream with two radial powder feed injection ports. The feed pressures and flow rates of the coating material and coating material additive may be adjusted to inject the material on the outer edge of the plasma plume using direct 90 degree angle injection. This may permit the coating material particles to soften but not completely melt and the coating material additive to not burn off but rather soften sufficiently for adherence in the abradable layer.

Figure 4:
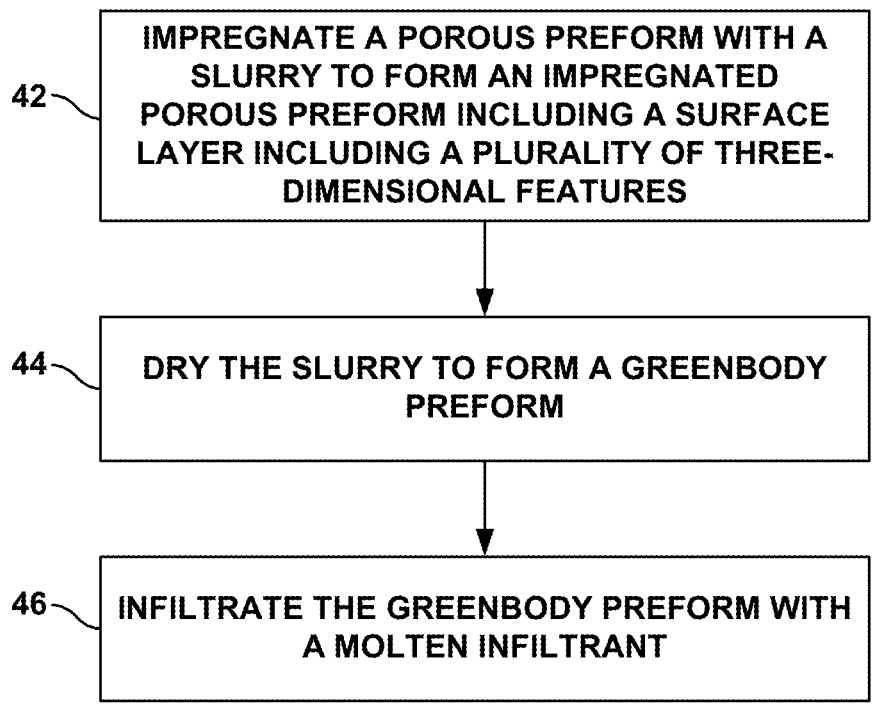
FIG. 4 is a flow diagram illustrating an example technique for forming an article including a ceramic matric composite (CMC) that includes a surface layer including three-dimensional surface features.
Figure 5:
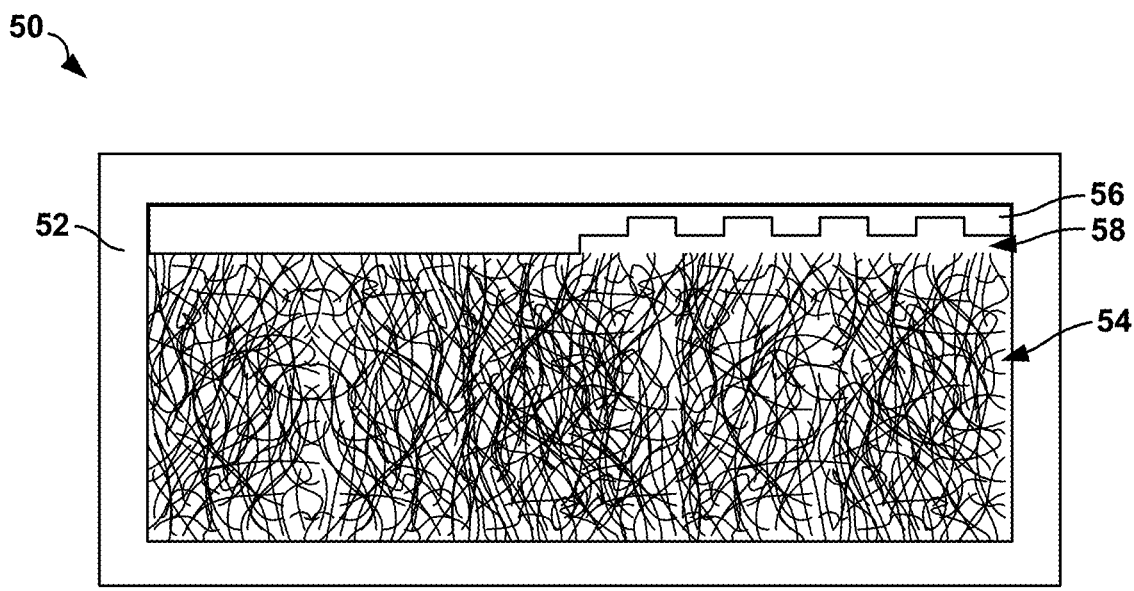
FIG. 5 is a conceptual diagram illustrating an example assembly including a porous preform, a mold, and a cast for forming an article including a ceramic matric composite (CMC) that includes a surface layer including three-dimensional surface features.

Surface layer 14 may be formed using a cast in an impregnation and infiltration technique. FIG. 4 is a flow diagram illustrating an example technique for forming a composite article including a ceramic matric composite (CMC) that includes a surface layer including three-dimensional surface features. FIG. 5 is a conceptual diagram illustrating an example assembly 50 including a porous preform 54, a mold 52, and a cast 56 for forming a composite article including a CMC that includes a surface layer including three-dimensional surface features. The technique of FIG. 4 will be described with concurrent reference to the conceptual diagram of FIG. 5. However, in other examples, the technique of FIG. 4 may be used to form another article, or with another assembly 50.

The technique of FIG. 4 includes impregnating a porous preform 54 with a slurry to form an impregnated porous preform including a surface layer 58 including a plurality of three-dimensional surface features (42). As shown in FIG. 5, in some examples, porous preform 54 and cast 56 may be placed in a mold 52, which defines a cavity for receiving porous preform 54 and cast 56. In other examples, porous preform 54 and cast 56 may not be placed in mold 52.

In some examples, mold 52 may define the shape of the component to be formed or nearly define the shape of the component to be formed. This may be referred to as a near-net shape. This may reduce an amount of machining used after the impregnating and infiltrating technique to shape the composite article to the desired final shape. In other examples, mold 52 may define another shape, and the component may be further manipulated or machined to its desired final shape. Mold 52 may be formed of a refractory material, such as for example, graphite, silica, alumina, or the like. The material from which mold 52 is formed may be selected to allow release of the component after completion of the infiltration step, and to be sufficiently non-reactive with the materials used in forming the composite article.

Cast 56 defines the negative of the shape of at least one surface of the composite article, including three-dimensional surface features, and defines a space 58 between porous preform 54 and cast 56. For example, as shown in FIG. 5, cast 56 defines the negative shape of surface layer 58, including the three-dimensional surface features formed in surface layer 58. In some examples, as shown in FIG. 5, surface layer 58 extends over only part of a surface of the composite article, so cast 56 defines an appropriate complementary shape. In other examples, surface layer 58 extends over an entire surface of the composite article, so cast 56 defines an appropriate complementary shape. In still other examples, more than one surface of the composite article may include a surface layer, and cast 56 may extend over more than one surface of the composite article, or assembly 50 may include more than one cast 56.

In some examples, cast 56 may be formed by first forming a master mold that includes the selected three-dimensional surface features. Cast 56 then may be molded from the master mold. In some examples, the master mold may be formed using directed energy deposition material addition (DLD MA, e.g., three-dimensional printing). DLD MA may facilitate forming three-dimensional features that are small, complex, or both in the master mold. In other examples, other cast machining techniques may be used to form a master mold. In some examples, the master mold may include a polymer such as a rubber, a stereolithographic plastic, a metal, a ceramic, or the like.

In other examples, cast 56 may be formed directly with the negative shape of the three-dimensional surface features, e.g., by DLD MA or other cast machining techniques.

In some examples, cast 56 may be flexible. For example, cast 56 may include a silicone, a polyurethane, or the like. In other examples, cast 56 may be substantially rigid.

Porous preform 54 may include the reinforcement material (e.g., reinforcement material 20 of FIG. 1) that will be in the composite article. For example, porous preform 54 may include continuous or discontinuous reinforcement material, such as discontinuous whiskers, platelets, particulates, fibers continuous monofilament, or multifilament weave. In some examples, the reinforcement material may include SiC, $Si_3N_4$, $Al_2O_3$, aluminosilicate, $SiO_2$, or the like.

The technique of FIG. 4 includes impregnating a porous preform 54 with a slurry to form an impregnated porous preform including a surface layer 58 including a plurality of three-dimensional surface features (42). In some examples, the slurry may include matrix material precursor, a solvent, and, optionally, one or more additives. For example, the solvent may include water, ethanol, isopropyl alcohol, methyl ethyl ketone, toluene, or the like. The optional additives may include, for example, a binder (e.g. polyethylene glycol, acrylate co-polymers, latex co-polymers, polyvinyl pyrrolidone co-polymers, polyvinyl butyral, or the like), a dispersant (e.g., ammonium polyacrylate, polyvinyl butyral, a phosphate ester, polyethylene imine, BYK® 110 (available from Byk USA, Inc., Wallingford Conn.), or the like), or the like. The matrix material precursor may include, for example, silicon carbide particles or a carbon source. In some examples, the matrix material precursor may react with silicon metal or silicon alloy during the melt infiltration process to form the matrix of the CMC. In some examples, at least some of the matrix material precursor remains unreacted and forms a particulate within the matrix of the CMC.

Regardless of the composition of the slurry, porous preform 54 may be impregnated with the slurry (42). The slurry may substantially fill the pores of porous preform 54 and the space 58 between porous preform 54 and cast 56. Prior to impregnation, the preform fibers may optionally be prepared for slurry infiltration by exposing the fibers to a solution including, for example, water, solvents, surfactants, or the like aid impregnation of the fibers. A vacuum may optionally be drawn prior to slurry introduction to purge gas from porous preform 54 and further enhance impregnation. The slurry infiltration may be conducted at any suitable temperature, including room temperature (between about 20° C. and about 35° C.). The slurry infiltration may be enhanced by application of external pressure after slurry introduction, such as a pressure gradient of about one atmosphere.

The resulting impregnated preform may be at least partially dried to remove the solvent and form a greenbody preform (44). The drying may be conducted in any suitable manner, and in various examples, the impregnated preform can be dried at room temperature under vacuum at about 1 Torr, or may be dried at ambient pressure at a temperature of up to about 150° C. The greenbody preform may define a shape that substantially conforms to the shape of mold 52 and cast 54.

The technique of FIG. 4 also includes infiltrating the greenbody preform with a molten infiltrant to form a composite article including the three-dimensional surface features (46). In some examples, prior to infiltrating the greenbody preform with a molten infiltrant to form a composite article including the three-dimensional surface features (46), cast 56 may be removed from mold 52, or the greenbody preform may be removed from mold 52 to another apparatus for performing the melt infiltration. The molten infiltrant may include a molten metal alloy infiltrant. The molten metal alloy infiltrant wicks between the ceramic particles in the green composite article and occupies the interstices between the particles until the green composite article is fully densified to less than about 5%, or less than about 3%, or less than about 1%, porosity to form a composite article. In some examples, the metal alloy infiltrant may include Si, B, Al, Y, Ti, Zr, oxides thereof, and mixtures and combinations thereof.

In some examples, the temperature for metal alloy infiltration such as Si is about 1400° C. to about 1500° C. Under these conditions, the duration of the infiltration can be between about 15 minutes and about 4 hours, or between about 60 minutes and about 20 minutes. The infiltration process can optionally be carried out under vacuum, but in other examples can be carried out in inert gas under atmospheric pressure to limit evaporation losses.

In some examples, the final composite article includes between about 20 volume percent (vol. %) and about 60 vol. % reinforcement material, or between about 30 vol. % and about 50 vol. % reinforcement material; between about 1 vol. % and about 79 vol. % matrix material precursor, or between about 35 vol. % and about 60 vol. % infiltrated matrix material precursor; and between about 1 vol. % and about 79 vol. % infiltrated alloy, or between about 5 vol. % and about 20 vol. % infiltrated alloy (e.g., for a total of between about 40 vol. % and about 80 vol. % matrix material). The composite article may include no macroscopic porosity, which in this application means pores with an average pore size of greater than about 200 or greater than about 50 or greater than about 2 μm, and includes a porosity of less than about 5 vol. %, or less than about 3 vol. %, or less than about 1 vol. %.

Figure 6:
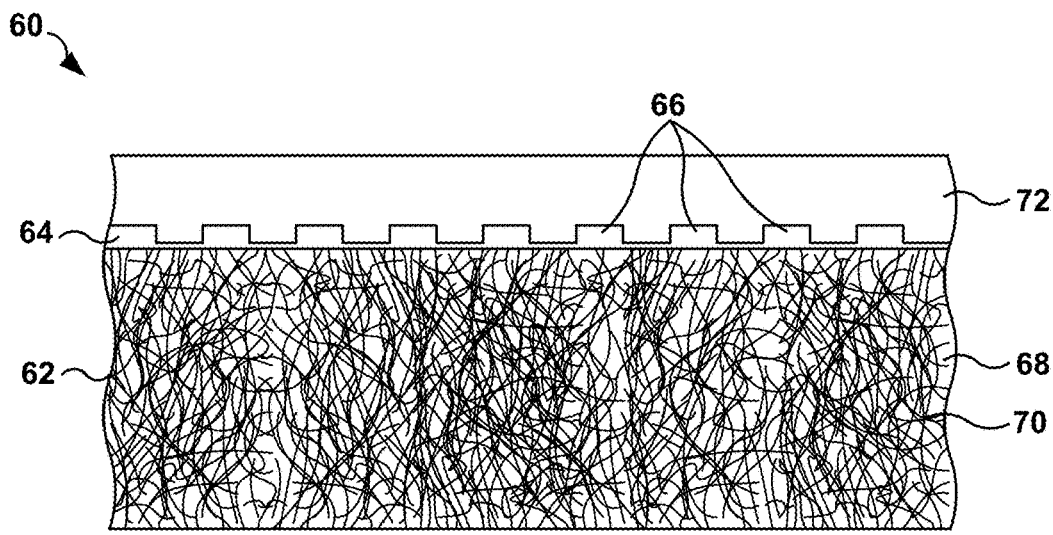
FIG. 6 is a conceptual diagram illustrating another example article including a ceramic matric composite (CMC) that includes a surface layer including three-dimensional surface features and coating system on the surface layer.

In this way, the technique of FIG. 4 may result in formation of a composite article (or CMC) as shown in FIG. 1, in which surface layer 14 is integral with CMC 12 and includes the same composition as matrix material 18. In other examples, a composite article may include a surface layer that is not integral with the CMC, that has a different composition than the matrix material of the CMC, or both. FIG. 6 is a conceptual diagram illustrating another example article 60 including a CMC 62 that includes a surface layer 64 including three-dimensional surface features 66 and coating system on the surface layer 64. In the example shown in FIG. 6, surface layer 64 is not formed integral with CMC 62.

CMC 62, matrix material 68, and reinforcement material 60 may be similar to or substantially the same as CMC 12, matrix material 18, and reinforcement material 20 described above with respect to article 10 of FIG. 1. Similarly, surface features 66, and outer coating 72 may be similar to or substantially the same as surface features 16 and outer coating 24 described with respect to article 10 of FIG. 1.

Unlike surface layer 14 of FIG. 1, surface layer 64 of FIG. 6 is not formed integrally with CMC 62. Instead, surface layer 64 may be formed using a stamping technique using a cast. In some examples, surface layer 64 includes a similar or substantially the same material as matrix material 68. In other examples, surface layer 64 includes a different material than matrix material 68. In some examples, surface layer 64 may include a ceramic material similar to the ceramic material in matrix material, but with a different composition. For example, surface layer 64 may include SiC, $Si_3N_4$, $Al_2O_3$, aluminosilicate, $SiO_2$, or the like, and may have a different composition than matrix material 68. In some examples, surface layer 64 additionally may include silicon metal, carbon, or the like. In some examples, surface layer 64 may include mixtures of two or more of SiC, $Si_3N_4$, $Al_2O_3$, aluminosilicate, silica, silicon metal, carbon, or the like.

In other examples, surface layer 64 may be a bond coating, and may include any of the materials described above with respect to bond coating 22. For example, surface layer 64 may include silicon metal, alone, or mixed with at least one other constituent. For example, surface layer 64 may include silicon metal and at least one of a transition metal carbide, a transition metal boride, or a transition metal nitride. As other examples, surface layer 64 may include mullite (aluminum silicate, $Al_6Si_2O_{13}$), silica, a silicide, or the like, alone, or in any combination (including in combination with one or more of silicon metal, a transition metal carbide, a transition metal boride, or a transition metal nitride). In examples in which surface layer 64 includes a bond coating, three-dimensional surface features 66 are formed in the bond coating.

Figure 7:
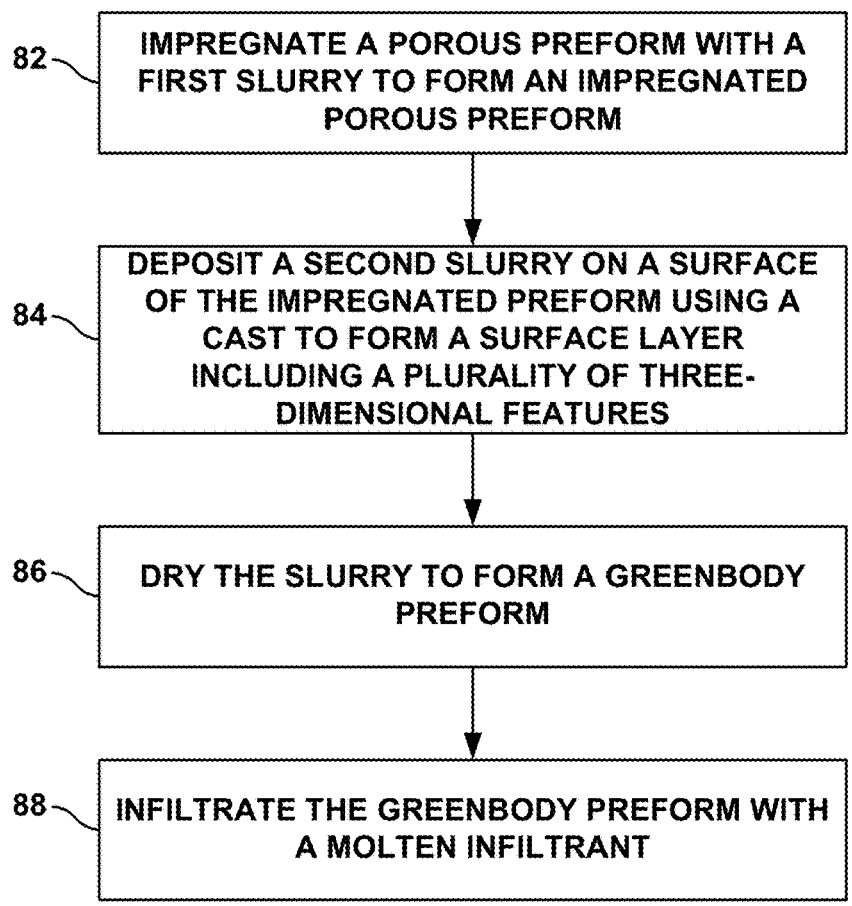
FIG. 7 is a flow diagram illustrating an example technique for forming an article including a ceramic matric composite (CMC) that includes a surface layer including three-dimensional surface features.
Figure 8:
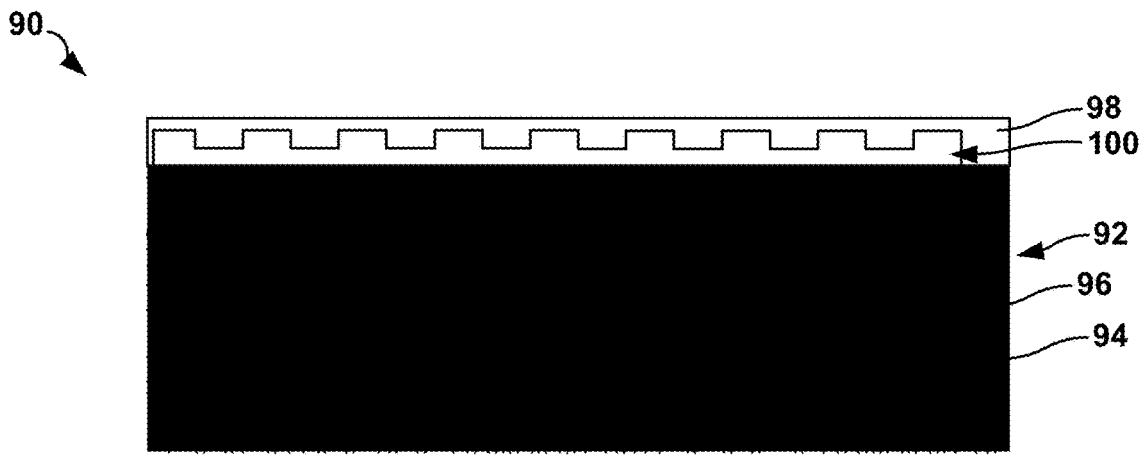
FIG. 8 is a conceptual diagram illustrating an example assembly including an impregnated porous preform and a cast for forming an article including a ceramic matric composite (CMC) that includes a surface layer including three-dimensional surface features.

Surface layer 64 may be formed using a three-dimensional cast and a stamping technique, as shown in FIGS. 7 and 8. FIG. 7 is a flow diagram illustrating an example technique for forming an article including a CMC that includes a surface layer including three-dimensional surface features. FIG. 8 is a conceptual diagram illustrating an example assembly 90 including an impregnated porous preform 92 and a cast 98 for forming an article including a CMC that includes a surface layer including three-dimensional surface features.

The technique of FIG. 7 optionally includes impregnating a porous preform with a first slurry to form an impregnated porous preform 92 (82). During this impregnation process, the porous preform may be placed in a mold that does not also enclose cast 98. The porous preform (before impregnation) may be similar to or substantially the same as porous preform 54 illustrated in and described with respect to FIG. 5. Similarly, the first slurry may be similar to or substantially the same as the slurry described with respect to FIGS. 4 and 5. For example, the slurry may include a matrix material precursor, a solvent, and, optionally, one or more additives.

Regardless of the composition of the slurry, porous preform 54 may be impregnated with the slurry (82). Prior to impregnation, the preform fibers may optionally be prepared for slurry infiltration by exposing the fibers to a solution including, for example, water, solvents, surfactants, or the like aid impregnation of the fibers. A vacuum may optionally be drawn prior to slurry introduction to purge gas from the porous preform and further enhance impregnation. The slurry infiltration may be conducted at any suitable temperature, including room temperature (between about 20° C. and about 35° C.). The slurry infiltration may be enhanced by application of external pressure after slurry introduction, such as a pressure gradient of about one atmosphere.

Following slurry impregnation of the porous preform, the resulting impregnated preform is at least partially dried to remove the solvent and form an impregnated preform 92, which includes dried slurry 94 and reinforcement material 96.

The technique of FIG. 7 also includes depositing a second slurry on a surface of impregnated preform 92 using a cast 98 to form a surface layer including a plurality of three-dimensional surface features (84). As shown in FIG. 8, in some examples, cast 98 may be used to stamp the second slurry on the surface of impregnated preform 92. Cast 98 may define the negative shape of the surface layer including the three-dimensional surface features, shown in FIG. 8 as space 100 between cast 98 and impregnated preform 92. In some examples, cast 98 may be similar to or substantially the same as cast 56 shown in FIG. 5, and may be flexible or rigid.

Cast 98 may be used to stamp the second slurry on the surface of impregnated preform 92. In some examples, the second slurry may include the same composition as the first slurry. The second slurry may include any of the slurry compositions described herein, e.g., with respect to FIGS. 4 and 5.

In some examples, cast 98 may define a surface layer that covers all of a surface of impregnated preform 92, as shown in FIG. 8. In other examples, cast 98 may define a surface layer that covers only part of a surface of impregnated preform 92 (e.g., similar to the example shown in FIG. 5). In some examples, more than one cast 98 may be used to define surface layers at different locations (e.g., different surfaces) of impregnated preform 92.

After depositing the second slurry on the surface of impregnated preform 92 using cast 98 to form a surface layer including a plurality of three-dimensional surface features (84), the surface layer may be at least partially dried to form a greenbody preform (86). The drying may be conducted in any suitable manner, and in various examples, the surface layer can be dried at room temperature under vacuum at about 1 Torr, or may be dried at ambient pressure at a temperature of up to about 150° C. The greenbody preform may define a shape that substantially conforms to the shape of impregnated preform 92 and cast 98.

The technique of FIG. 7 also includes infiltrating the greenbody preform with a molten infiltrant to form a composite article including the three-dimensional surface features (88). The molten infiltrant may include a molten metal alloy infiltrant. The molten metal alloy infiltrant wicks between the ceramic particles in the green composite article and occupies the interstices between the particles until the green composite article is fully densified to less than about 5%, or less than about 3%, or less than about 1%, porosity to form a composite article. In some examples, the metal alloy infiltrant may include Si, B, Al, Y, Ti, Zr, oxides thereof, and mixtures and combinations thereof.

In some examples, the temperature for metal alloy infiltration such as Si is about 1400° C. to about 1500° C. Under these conditions, the duration of the infiltration can be between about 15 minutes and about 4 hours, or between about 60 minutes and about 20 minutes. The infiltration process can optionally be carried out under vacuum, but in other examples can be carried out in inert gas under atmospheric pressure to limit evaporation losses.

In this way, the technique of FIG. 7 may result in formation of a composite article (or CMC) as shown in FIG. 6, in which surface layer 64 is integral with CMC 62 and includes a different composition than matrix material 68.

Figure 9:
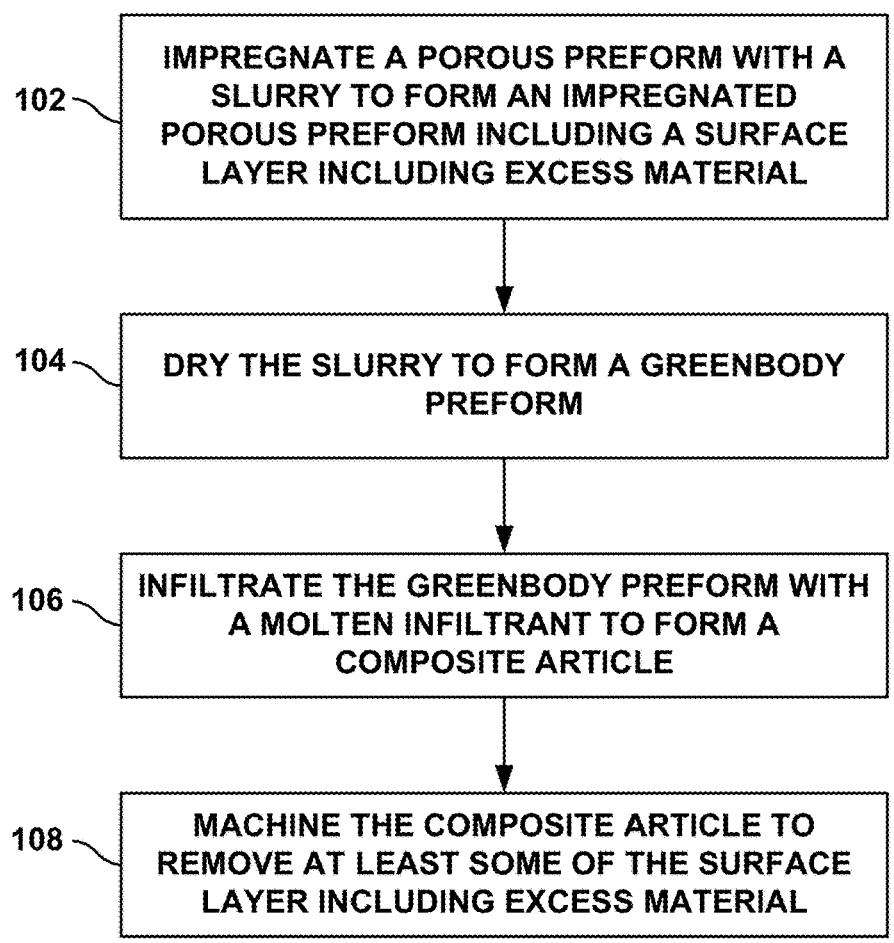
FIG. 9 is a flow diagram illustrating an example technique for forming an article including a ceramic matric composite (CMC) that includes a surface layer including excess material.

The preceding examples have described composite articles that include three-dimensional surface features and technique for forming such composite articles. In other examples, the disclosure describes composite articles including a surface layer that includes excess material and techniques for forming composite articles including a surface layer that includes excess material. FIG. 9 is a flow diagram illustrating an example technique for forming an article including a CMC that includes a surface layer including excess material.

The technique of FIG. 9 includes impregnating a porous preform with a slurry to form an impregnated porous preform including a surface layer including excess material (102). The shape of the surface layer including the excess material is defined by a cast. Step (102) may be similar to or substantially the same as step (42) of FIG. 4. In some examples, the surface layer including the excess material includes three-dimensional surface features defined by the cast. In other examples, the cast may define a surface that does not include three-dimensional surface features, and the surface layer does not include three-dimensional surface features.

Similarly, the porous preform, cast, mold, and slurry may be similar to or substantially the same as porous preform 54, cast 56, mold 52 and the slurry described with respect to FIGS. 4 and 5 (aside from the cast not including three-dimensional features in some examples).

The technique of FIG. 9 also includes at least partially drying the slurry to form a greenbody preform (104), which may be similar to or substantially the same as step (44) of FIG. 4. Further, the technique of FIG. 9 includes infiltrating the greenbody preform with a molten infiltrant to form a composite article including the three-dimensional surface features (106), which may be similar to or substantially the same as step (46) of FIG. 4.

The technique of FIG. 9 additionally includes machining the composite article to remove at least some of the surface layer including excess material to define a contact surface for contacting another component (108). The machining may include any type of mechanical machining, including, for example, milling, turning, shaping, planing, grinding, polishing, grit blasting, or the like. The machining may remove at least some of the excess material to reduce a dimension of the composite article and facilitate fit of the composite article with another component. The surface layer including excess material may reduce a chance that the machining exposes and/or damages reinforcement material in the underlying CMC.

Figure 10:
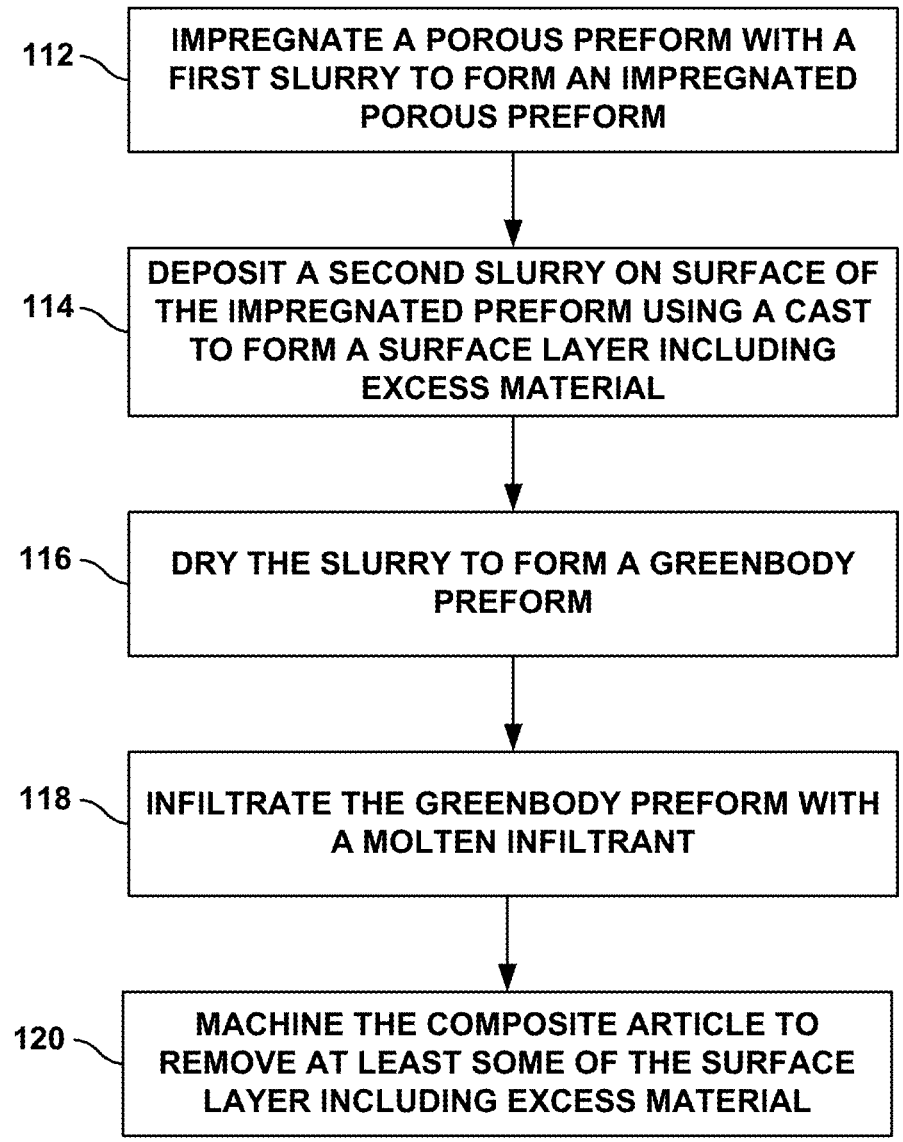
FIG. 10 is a flow diagram illustrating another example technique for forming an article including a ceramic matric composite (CMC) that includes a surface layer including excess material.

The technique of FIG. 9 results in a surface layer including excess material that includes the same composition as the matrix material of the underlying CMC. In other examples, the surface layer including excess material may include a different composition than the matrix material. FIG. 10 is a flow diagram illustrating another example technique for forming an article including a ceramic matric composite (CMC) that includes a surface layer including excess material.

The technique of FIG. 10 may optionally include impregnating a porous preform with a first slurry to form an impregnated porous preform (112). This step may be similar to or substantially the same as step (82) of FIG. 7. The technique of FIG. 10 also may include depositing a second slurry on a surface of the impregnated preform using a cast to form a surface layer including excess material (114). In some examples, this may include stamping the second slurry on the surface of the impregnated preform using the cast to form the surface layer including excess material (114). The shape of the surface layer including the excess material is defined by a cast. This step may be similar to or substantially the same as step (82) of FIG. 7. In some examples, the surface layer including the excess material includes three-dimensional surface features defined by the cast. In other examples, the cast may define a surface that does not include three-dimensional surface features, and the surface layer does not include three-dimensional surface features.

After depositing the second slurry on the surface of the impregnated preform using the cast to form a surface layer including excess material (114), the surface layer may be at least partially dried to form a greenbody preform (116). The technique of FIG. 10 also includes infiltrating the greenbody preform with a molten infiltrant to form a composite article including the surface layer including excess material (18).

The shape of the surface layer including the excess material is defined by a cast. Step (102) may be similar to or substantially the same as step (42) of FIG. 4. In some examples, the surface layer including the excess material includes three-dimensional surface features defined by the cast. In other examples, the cast may define a surface that does not include three-dimensional surface features, and the surface layer does not include three-dimensional surface features.

The technique of FIG. 10 additionally includes machining the composite article to remove at least some of the surface layer including excess material to define a contact surface for contacting another component (118). The machining may include any type of mechanical machining, including, for example, milling, turning, shaping, planing, grinding, polishing, grit blasting, or the like. The machining may remove at least some of the excess material to reduce a dimension of the composite article and facilitate fit of the composite article with another component. The surface layer including excess material may reduce a chance that the machining exposes and/or damages reinforcement material in the underlying CMC. By using the cast in a stamping technique, as described in FIG. 10, in some examples, the surface layer including excess material may include a different composition than the matrix material in the underlying CMC.

Figure 11:
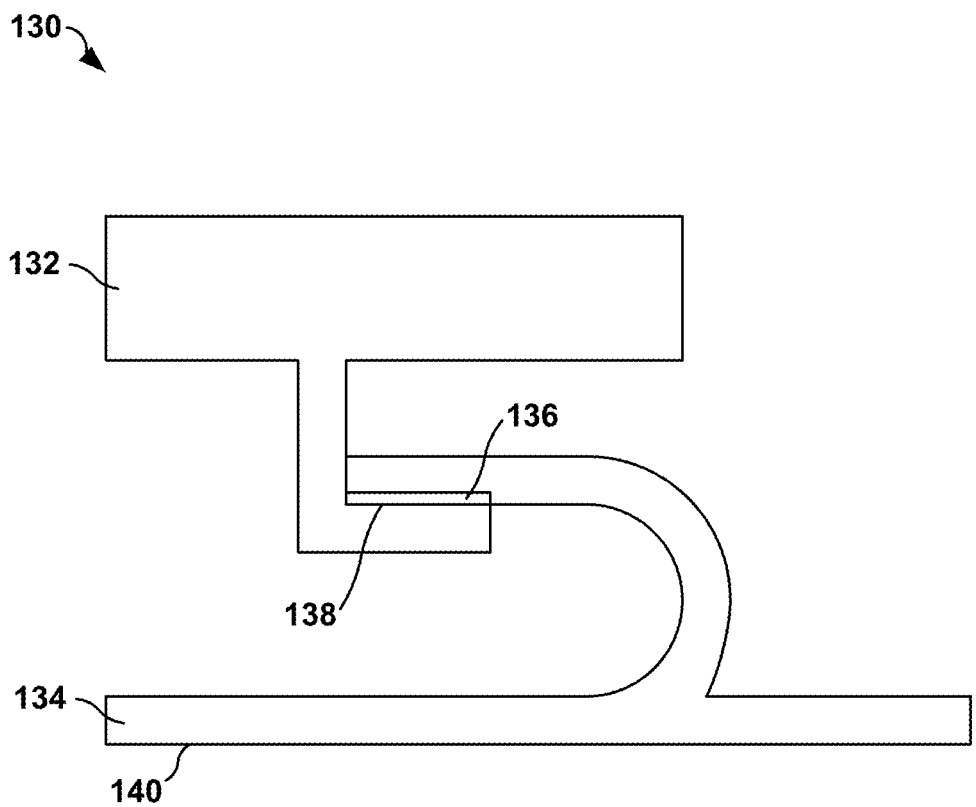
FIG. 11 is a conceptual diagram illustrating an example system including a support component and an article including a ceramic matric composite (CMC) that includes a surface layer including excess material.

The composite article including the surface layer including excess material may be used in a system including another component, and the surface layer including excess material may form a contact surface between the composite article and the other component. FIG. 11 is a conceptual diagram illustrating an example system 130 including a support component 132 and a composite article 134 including a CMC that includes a surface layer including excess material 136. In the example shown in FIG. 11, composite article 134 may be a seal segment of a gas turbine engine, and support component 132 may be a support structure. Support component 132 may be formed of a metal, alloy, ceramic, or composite. The surface layer including excess material 136 forms a contact surface 138 between composite article 134 and support component 132. The surface layer including excess material 136 allows for machining of this contact surface 138 of composite article 134 to facilitate formation of a close fit between composite article 134 and support component 132, e.g., to spread forces between composite article 134 and support component 132 over a relatively large surface area.

In some examples, surface 140 of composite article 134 includes a surface layer including three-dimensional features and, optionally, a coating on surface 140.

Clause 1: A method comprising: depositing a slurry on a surface of an impregnated porous preform using a cast to form a surface layer including a plurality of three-dimensional surface features, wherein the cast defines the negative of the three-dimensional surface features, and wherein the impregnated porous preform comprises a reinforcement material and at least one matrix precursor; drying the slurry to form a greenbody preform; and infiltrating the greenbody preform with a molten infiltrant to form a composite article including the three-dimensional surface features.

Clause 2: The method of clause 1, wherein: the slurry comprises a first slurry; and the method further comprises, prior to depositing the first slurry on the surface of the impregnated porous preform: impregnating a porous preform with a second slurry; and drying the second slurry to form the impregnated porous preform.

Clause 3: The method of clause 2, wherein a composition of the first slurry is different than a composition of the second slurry.

Clause 4: The method of clause 2, wherein a composition of the first slurry is the same as a composition of the second slurry.

Clause 5: The method of any one of clauses 1 to 4, wherein depositing the slurry on the surface of the impregnated porous preform using the cast to form the surface layer including the plurality of three dimensional features comprises stamping the slurry on the surface of the impregnated porous preform using the cast to form the surface layer including the plurality of three dimensional features.

Clause 6: A method comprising: impregnating a porous preform with a slurry to form an impregnated porous preform including a surface layer including a plurality of three-dimensional surface features, wherein the shapes of respective three-dimensional surface features the plurality of three-dimensional surface features are defined by a cast; drying the slurry to form a greenbody preform; and infiltrating the greenbody preform with a molten infiltrant to form a composite article including the three-dimensional surface features.

Clause 7: The method of any one of clauses 1 to 6, wherein the slurry or the first slurry comprises particles, a binder, and a solvent.

Clause 8: The method of any one of clauses 1 to 7, wherein the three-dimensional surface features comprise at least one of depressions, grooves, ridges, or protrusions.

Clause 9: The method of any one of clauses 1 to 8, wherein the plurality of three-dimensional surface features extend over only part of the surface.

Clause 10: The method of any one of clauses 1 to 8, wherein the plurality of three-dimensional surface features extend over substantially all of the surface.

Clause 11: The method of any one of clauses 1 to 10, further comprising forming a bond coating on the surface layer including the plurality of three-dimensional surface features, wherein the bonding coat comprises silicon.

Clause 12: The method of any one of clauses 1 to 10, further comprising forming an environmental barrier coating on the surface layer including the plurality of three-dimensional surface features, wherein the environmental barrier coating comprises at least one of barium strontium aluminosilicate, strontium aluminosilicate, barium aluminosilicate, a rare earth disilicate, or a rare earth monosilicate.

Clause 13: The method of clause 11, further comprising forming an environmental barrier coating on the bond coating, wherein the environmental barrier coating comprises at least one of barium strontium aluminosilicate, strontium aluminosilicate, barium aluminosilicate, a rare earth disilicate, or a rare earth monosilicate.

Clause 14: The method of any one of clauses 1 to 10, further comprising forming an abradable coating on the surface layer including the plurality of three-dimensional surface features, wherein the abradable coating comprises at least one of barium strontium aluminosilicate, strontium aluminosilicate, barium aluminosilicate, a rare earth disilicate, or a rare earth monosilicate, and wherein the abradable coating comprises porosity between about 10 vol. % and about 50 vol. %.

Clause 15: The method of clause 11, further comprising forming an abradable coating on the bond coating, wherein the abradable coating comprises at least one of barium strontium aluminosilicate, strontium aluminosilicate, barium aluminosilicate, a rare earth disilicate, or a rare earth monosilicate, and wherein the abradable coating comprises porosity between about 10 vol. % and about 50 vol. %.

Clause 16: The method of clause 12 or 13, further comprising forming an abradable coating on the environmental barrier coating, wherein the abradable coating comprises at least one of barium strontium aluminosilicate, strontium aluminosilicate, barium aluminosilicate, a rare earth disilicate, or a rare earth monosilicate, and wherein the abradable coating comprises porosity between about 10 vol. % and about 50 vol. %.

Clause 17: The method of any one of clauses 1 to 10, further comprising forming a CMAS-resistant coating on the surface layer including the plurality of three-dimensional surface features, wherein the CMAS-resistant coating comprises a rare earth oxide, silica, and an alkali oxide and is essentially free of zirconia and hafnia.

Clause 18: The method of clause 11, further comprising forming a CMAS-resistant coating on the bond coating, wherein the CMAS-resistant comprises a rare earth oxide, silica, and an alkali oxide and is essentially free of zirconia and hafnia.

Clause 19: The method of clause 12 or 13, further comprising forming a CMAS-resistant coating on the environmental barrier coating, wherein the CMAS-resistant coating comprises a rare earth oxide, silica, and an alkali oxide and is essentially free of zirconia and hafnia.

Clause 20: The method of any one of clauses 1 to 19, further comprising: 3D printing a master mold defining the geometry of the three-dimensional surface features; and forming the cast from as the negative of the master mold.

Clause 21: The method of any one of clauses 1 to 20, wherein the cast is flexible.

Clause 22: A method comprising: depositing a slurry on a surface of an impregnated porous preform using a cast to form a surface layer including excess material, wherein the cast defines the shape of the surface layer including excess material, and wherein the impregnated porous preform comprises a reinforcement material and at least one matrix precursor; drying the slurry to form a greenbody preform; removing at least some of the green surface layer including excess material to make it close to the final dimension; infiltrating the greenbody preform with a molten infiltrant to form a composite article including the surface layer including excess material; and machining the composite article to remove at least some of the surface layer including excess material to define a contact surface for contacting another component.

Clause 23: The method of clause 22, wherein: the slurry comprises a first slurry; and the method further comprises: impregnating a porous preform with a second slurry; and drying the second slurry to form the impregnated porous preform.

Clause 24: The method of clause 23, wherein a composition of the first slurry is different than a composition of the second slurry.

Clause 25: The method of clause 23, wherein a composition of the first slurry is the same as a composition of the second slurry.

Clause 26: The method of any one of clauses 22 to 25, wherein depositing the slurry on the surface of the impregnated porous preform using the cast to form the surface layer including excess material comprises stamping the slurry on the surface of the impregnated porous preform using the cast to form the surface layer including the excess material.

Clause 27: A method comprising: impregnating a porous preform with a slurry to form an impregnated porous preform including a surface layer including excess material, wherein the shape of the surface layer including the excess material is defined by a cast; drying the slurry to form a greenbody preform; infiltrating the greenbody preform with a molten infiltrant to form a composite article including the excess material; and machining the composite article to remove at least some of the surface layer including excess material to define a contact surface for contacting another component.

Clause 28: The method of any one of clauses 22 to 27, wherein the surface layer including excess material defines a plurality of three-dimensional surface features, and wherein three-dimensional surface features of the plurality of three-dimensional surface features comprise at least one of depressions, grooves, ridges, or protrusions.

Clause 29: The method of any one of clauses 22 to 28, wherein the surface layer including excess material extends over only a portion of the surface.

Clause 30: The method of clause 29, wherein the surface layer including excess material extends over only a portion of the surface that is to contact another component.

Clause 31: The method of clause 30, further comprising: determining the portion of the composite article that is to contact another component.

Clause 32: The method of any one of clauses 22 to 28, wherein the surface layer including excess material extends over substantially all of the surface.

Clause 33: The method of any one of clauses 22 to 32, further comprising: 3D printing a master mold defining the geometry of the three-dimensional surface features; and forming the cast from as the negative of the master mold.

Clause 34: The method of any one of clauses 22 to 33, wherein the cast is flexible.

Clause 35: The method of any one of clauses 22 to 34, further comprising: assembling the composite article with a second component such that the surface layer including the excess material contacts the second component.

Clause 36: An assembly comprising: a flexible cast; a porous preform, wherein the flexible cast is adjacent to a surface of the porous preform; and a slurry in space between the flexible cast and the surface of the porous preform, and in pores of the porous preform.

Clause 37: An assembly comprising: a flexible cast; an impregnated porous preform, wherein the impregnated porous preform comprises a reinforcement material and at least one matrix precursor, and wherein the flexible cast is adjacent to a surface of the impregnated porous preform; and a slurry in space between the flexible cast and the surface of the impregnated porous preform.

Clause 38: The assembly of clause 36 or 37, wherein the cast defines a plurality of three-dimensional surface features comprising at least one of depressions, grooves, ridges, or protrusions.

Clause 39: The assembly of any one of clauses 36 to 38, wherein the space between the flexible cast and the surface of the porous preform or the surface of the impregnated porous preform extends over only part of the surface.

Clause 40: The assembly of any one of clauses 36 to 38, wherein the space between the flexible cast and the surface of the porous preform or the surface of the impregnated porous preform extends over substantially all of the surface.

Clause 41: The assembly of any one of clauses 36 to 40, wherein the cast comprises silicon or polyurethane.

Clause 42: A composite article formed by the method of any one of clauses 1 to 35.

Clause 43: An apparatus for performing the method of any one of clauses 1 to 35.

EXAMPLES

Example 1

Figure 12:
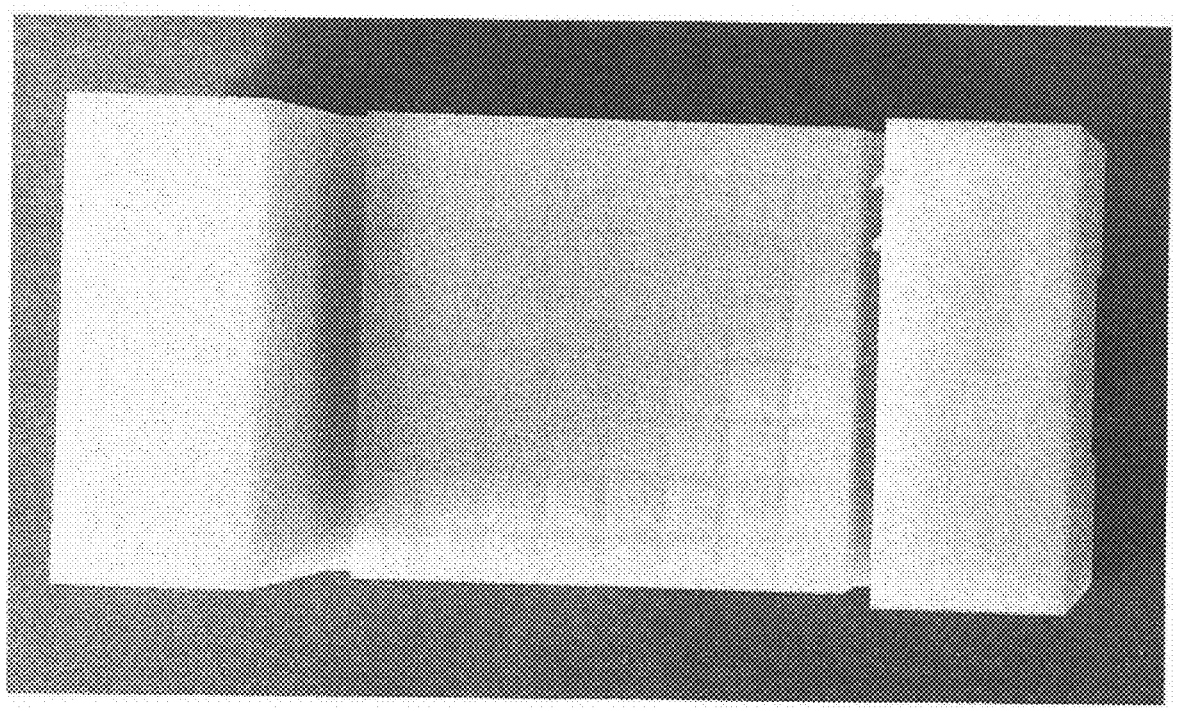
FIG. 12 is a photograph of an example master mold used to form a cast for forming a surface layer including three-dimensional surface features.

FIG. 12 is a photograph of an example master mold used to form a cast for forming a surface layer including three-dimensional surface features. The master mold was designed using computer aided design and manufactured using stereolithography. The material from which the master mold was formed is a UV curable plastic (a polypropylene-type material) available under the trade designation VisiJet® SL Flex from 3D Systems, Inc., Rock Hill, S.C. The master mold defines a pattern of three-dimensional surface features measuring approximately 1.25 inches by 1.25 inches.

Figure 13:
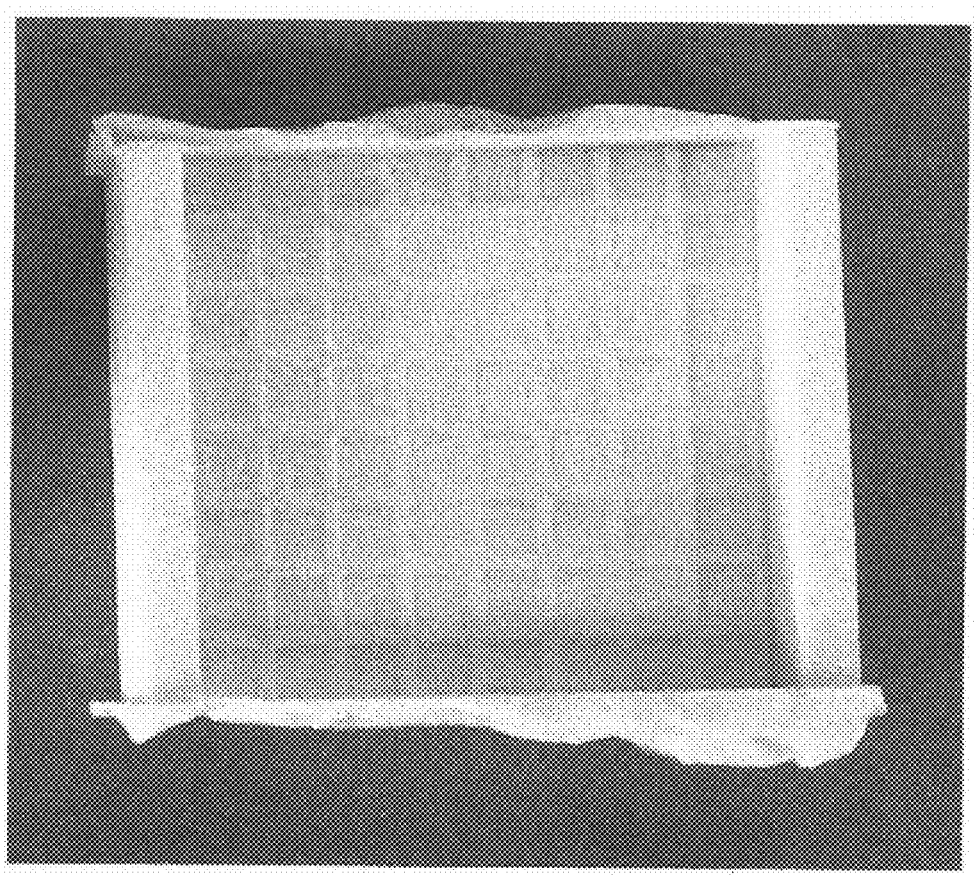
FIG. 13 is a photograph of an example cast for forming a surface layer including three-dimensional surface features.

FIG. 13 is a photograph of an example cast for forming a surface layer including three-dimensional surface features. The cast was formed using the master mold shown in FIG. 12. Initially, a mold release agent, polytetrafluoroethylene (PTFE), was sprayed on the master mold. A mixture of a silicone precursor available under the trade designation SilPak R2374-A from SILPAK, Inc., Pomona, Calif. was mixed with 10 wt. % silicone catalyst R-2374, also available from SILPAK, Inc., Pomona, Calif. The mixture was poured into the master mold and cured at room temperature overnight. The cast was easily detached from the master mold.

Figure 14:
FIG. 14 is a photograph of an example article including a ceramic matric composite (CMC) that includes a surface layer including three-dimensional surface features.

FIG. 14 is a photograph of an example article including a ceramic matric composite (CMC) that includes a surface layer including three-dimensional surface features. The article was formed using the cast shown in FIG. 13. Initially, a mold release agent, polytetrafluoroethylene (PTFE), was sprayed on the cast and dried. A slurry including carbon and silicon carbide particles was poured into the mold. Then, a CMC substrate was placed on the slurry-filled mold. Dead weight was applied on the CMC substrate while drying the slurry. After drying, the cast mold was removed, and the slurry-infiltrated CMC was melt infiltrated with a silicon alloy.

Example 2

Figure 15:
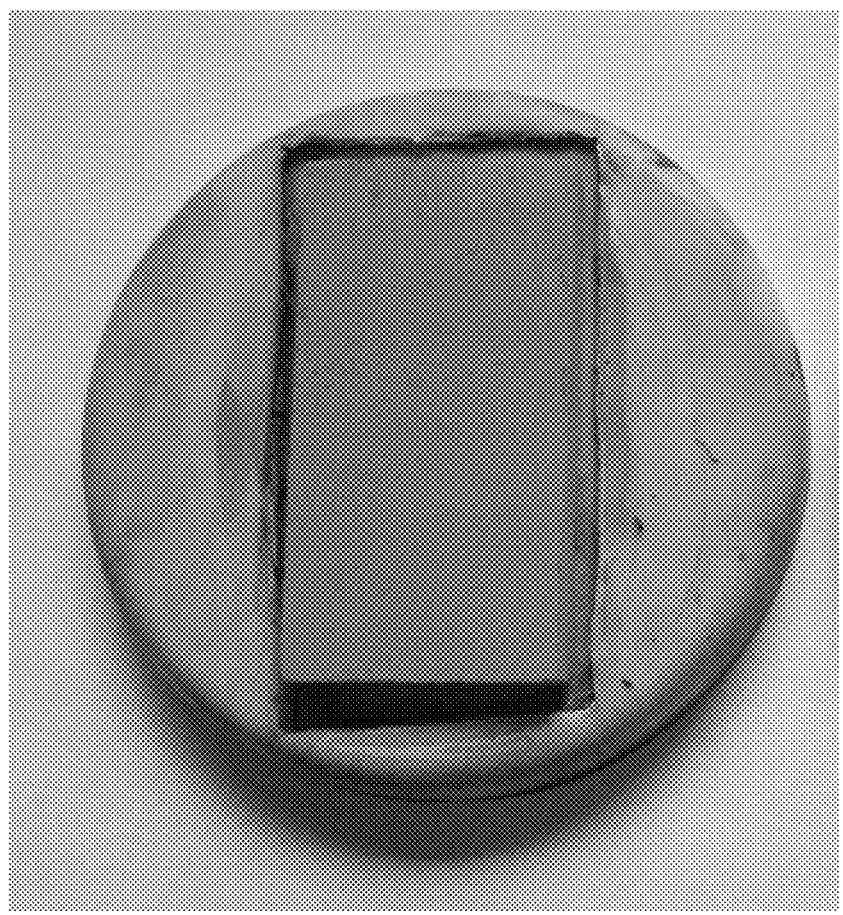
FIG. 15 is a photograph of an example greenbody preform disposed in a silicon rubber mold.
Figure 16:
FIG. 16 is a photograph of an example melt-infiltrated CMC including a surface coating including excess material.
Figure 17:
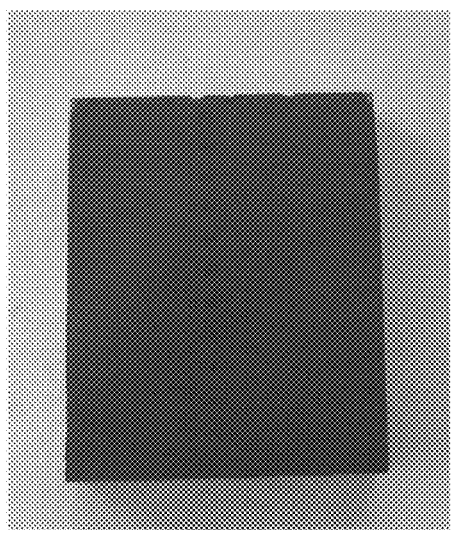
FIG. 17 is a photograph of a machined surface coating.

FIG. 15 is a photograph of an example greenbody preform disposed in a silicone rubber mold. The greenbody preform includes a slurry-infiltrated porous preform and a slurry coating stamped on the surface of the slurry-infiltrated porous preform. The slurry used to deposit the slurry coating included between 0.5% and about 10% by volume carbon and silicone carbide particles. The surface of the slurry-infiltrated porous preform on which the slurry was stamped measured about 1 inch by about 2 inches. After stamping and drying, the surface of the stamped slurry coating was ground using sand paper. The thickness of the stamped slurry coating was about 0.030 inch. The greenbody preform was then melt infiltrated with a silicon alloy. FIG. 16 is a photograph of an example melt-infiltrated CMC including a surface coating including excess material. The surface coating including excess material was then machined to a thickness of about 0.010 inch. FIG. 17 is a photograph of the machined surface coating.

Various examples have been described. These and other examples are within the scope of the following claims.

What is claimed is:

1. A method comprising:
filling a cast with a slurry;
stamping the slurry on a surface of an impregnated porous preform using the cast to form a surface layer including excess material, wherein the cast defines the shape of the surface layer including excess material, and wherein the impregnated porous preform comprises a reinforcement material and at least one ceramic matrix precursor;
drying the slurry to form a greenbody preform;
removing at least some of the green surface layer including excess material;
infiltrating the greenbody preform and the green surface layer with a molten infiltrant to form a ceramic matrix composite article including the surface layer; and
machining the ceramic matrix composite article to remove some of the surface layer including excess material to define a contact surface for contacting another component.

2. The method of claim 1, wherein:
the slurry comprises a first slurry; and
the method further comprises:
impregnating a porous preform with a second slurry; and
drying the second slurry to form the impregnated porous preform.

3. The method of claim 2, wherein a composition of the first slurry is different than a composition of the second slurry.

4. The method of claim 2, wherein a composition of the first slurry is the same as a composition of the second slurry.

5. The method of claim 1, wherein the surface layer including excess material defines a plurality of three-dimensional surface features, and wherein three-dimensional surface features of the plurality of three-dimensional surface features comprise at least one of depressions, grooves, ridges, or protrusions.

6. The method of claim 1, wherein the surface layer including excess material extends over only a portion of the surface.

7. The method of claim 1, wherein the surface layer including excess material extends over substantially all of the surface.

8. The method of claim 5, further comprising:
3D printing a master mold defining the geometry of the three-dimensional surface features; and
forming the cast from as the negative of the master mold.

9. The method of claim 1, wherein the cast is flexible.

10. The method of claim 1, further comprising:
assembling the ceramic matrix composite article with a second component such that the surface layer including the excess material contacts the second component.

11. A method comprising:
placing a porous preform in a mold adjacent a cast, wherein the porous preform comprises a reinforcement material;
impregnating the porous preform and a space between the porous preform and the cast with a slurry comprising a ceramic matrix precursor to form an impregnated porous preform including a surface layer including excess material, wherein the shape of the surface layer including the excess material is defined by a negative of the cast;
drying the slurry to form a greenbody preform;
infiltrating the greenbody preform with a molten infiltrant to form a ceramic matrix composite article including the excess material; and
machining the ceramic matrix composite article to remove some of the surface layer including excess material to define a contact surface for contacting another component.

12. The method of claim 11, wherein the surface layer including excess material defines a plurality of three-dimensional surface features, and wherein three-dimensional surface features of the plurality of three-dimensional surface features comprise at least one of depressions, grooves, ridges, or protrusions.

13. The method of claim 11, wherein the surface layer including excess material extends over only a portion of the surface.

14. The method of claim 11, wherein the surface layer including excess material extends over substantially all of the surface.

15. The method of claim 12, further comprising:
3D printing a master mold defining the geometry of the three-dimensional surface features; and
forming the cast from as the negative of the master mold.

16. The method of claim 11, wherein the cast is flexible.

17. The method of claim 11, further comprising:
assembling the ceramic matrix composite article with a second component such that the surface layer including the excess material contacts the second component.

* * * * *